United States Patent [19]

Ishibashi et al.

[11] Patent Number: 5,645,366
[45] Date of Patent: Jul. 8, 1997

[54] SHAFT COUPLING STRUCTURE OF DRIVE SHAFT

[75] Inventors: Toshio Ishibashi; Sinichi Kondou; Mitsuyasu Moriya; Yoshiyuki Watanabe, all of Atsugi, Japan

[73] Assignee: Unisia Jecs Corporation, Atsugi, Japan

[21] Appl. No.: 694,755

[22] Filed: Aug. 9, 1996

Related U.S. Application Data

[63] Continuation of Ser. No. 391,682, Feb. 21, 1995.

[30] Foreign Application Priority Data

| Feb. 28, 1994 | [JP] | Japan | 6-30687 |
| May 31, 1994 | [JP] | Japan | 6-119256 |
| Jan. 31, 1996 | [JP] | Japan | 7-14001 |

[51] Int. Cl.⁶ ................................................ F16B 3/04
[52] U.S. Cl. ............................................ 403/359; 403/357
[58] Field of Search ................................. 403/357, 359

[56] References Cited

U.S. PATENT DOCUMENTS

| 1,645,342 | 10/1927 | Moorhouse | 403/357 X |
| 2,397,905 | 4/1946 | Acton et al. | 403/359 X |
| 3,295,871 | 1/1967 | Naimer | 403/359 |
| 3,388,934 | 6/1968 | Chapman et al. | 403/357 |
| 3,415,153 | 12/1968 | Steiner | 403/359 X |
| 4,067,658 | 1/1978 | Ueno et al. | 403/357 |
| 4,667,530 | 5/1987 | Mettler et al. | 403/359 X |
| 5,460,574 | 10/1995 | Hobaugh | 403/359 X |

FOREIGN PATENT DOCUMENTS

| 60-185725 | 12/1985 | Japan . |
| 6-58341 | 3/1994 | Japan . |
| 65224 | 2/1950 | Netherlands . |

*Primary Examiner*—Anthony Knight
*Attorney, Agent, or Firm*—Foley & Lardner

[57] ABSTRACT

A shaft coupling structure for a split type drive shaft comprises an internally splined female shaft and an externally splined male shaft coaxially received in the female shaft to establish a spline-connection. A play suppression member is interposed between the male and female shafts for suppressing play of the male shaft relative to the female shaft and vice versa. The play suppression member includes an elongate member extending in and along an axially extending groove defined between the male and female shafts. A hook portion possessed by the elongate member detachably fixes to one of the male and female shafts. The elongate member also has a biasing structure, which biases the male and female shafts in radially opposite directions.

11 Claims, 10 Drawing Sheets

SHAFT COUPLING STRUCTURE OF DRIVE SHAFT

This application is a continuation, of application Ser. No. 08/391,682, filed Feb. 21, 1995.

BACKGROUND OF THE INVENTION

1. Field of the Invention

The present invention relates in general to shaft coupling structures, and more particularly to shaft coupling structures of a drive shaft or the like. More specifically, the present invention is concerned with the shaft coupling structures of a type that comprises an internally splined tubular member and an externally splined shaft member coupled in a spline-connection manner.

2. Description of the Prior Art

In FR (front engine rear drive) type motor vehicles, there is employed a drive shaft that transmits power from an engine (specifically, a transmission connected thereto) mounted on a front portion of the vehicle to the differential for the rear road wheels connected to a rear portion of the vehicle through suspension devices. To assure the power transmission from the transmission to the differential, two (front and rear) universal joints are usually used. The front joint connects the front end of the drive shaft to an output shaft of the transmission and the rear joint connects the rear end of the drive shaft to an input shaft of the differential. That is, the two universal joints serve to compensate for changes in angularity of a drive line from the transmission to the differential.

Some of the drive shafts are of a split type that comprises two parts coupled in a spline-connection manner to compensate for changes in the entire length of the drive line during movement of the vehicle.

However, drive shafts of the split type tend to produce play between the two parts due to the inherent construction thereof. In fact, the play tends to cause generation of marked noise when receiving pulsating torque from the engine and/or vibration from the vehicle body.

One of measures for overcoming such drawback has been proposed by Japanese Utility Model First Provisional Publication 60-185725. In this measure, an elastically deformable plastic piece is press-fitted between the spline-coupled portions of the two parts for eliminating or at least minimizing the undesired play. However, even the measure has failed to give satisfaction to users.

SUMMARY OF THE INVENTION

It is therefore an object of the present invention to provide a shaft coupling structure of a drive shaft or the like, which can give satisfaction to users.

According to the present invention, there is provided a shaft coupling structure of a drive shaft or the like, which is free of the above-mentioned play and easy to assemble.

According to the present invention, there is provided a shaft coupling structure that comprises an internally splined female shaft; an externally splined male shaft, the male shaft being coaxially received in the female shaft to establish a spline-connection therebetween; a play suppression member interposed between the male and female shafts for suppressing play of the male shaft relative to the female shaft and vice versa. The play suppression member includes an elongate member extending in and along an axially extending groove defined between the male and female shafts; a hook portion possessed by the elongate member, the hook portion being detachably fixed to one of the male and female shafts; and biasing means possessed by the elongate portion, the biasing means biasing the male and female shafts in radially opposite directions.

BRIEF DESCRIPTION OF THE DRAWINGS

Other objects and advantages of the present invention will become apparent from the following description when taken in conjunction with the accompanying drawings, in which.

DETAILED DESCRIPTION OF THE DRAWINGS

In the following, various embodiments of the present invention will be described in detail with reference to the accompanying drawings.

The description of the embodiments will be directed to a drive shaft assembly for FR motor vehicles, which has a shaft coupling structure of the present invention incorporated therein.

Figure 1:
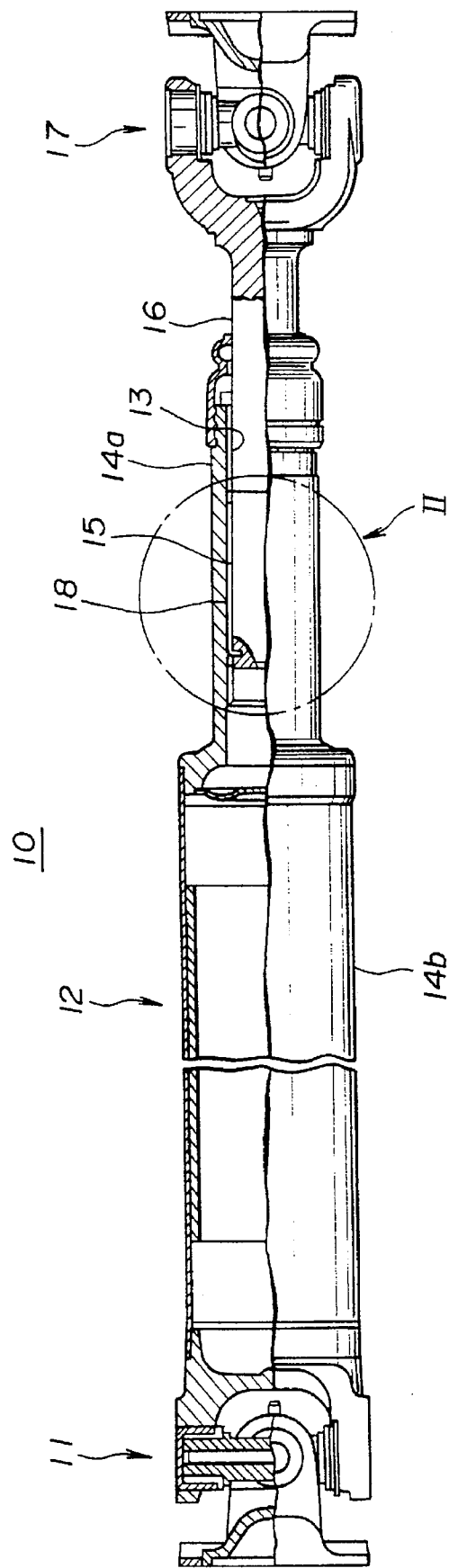
FIG. 1 is a partially cut sectional view of a drive shaft assembly having a shaft coupling structure of a first embodiment of the invention incorporated therein.

Referring to FIGS. 1 to 6, particularly FIG. 1, there is shown a drive shaft assembly 10 having a shaft coupling structure of a first embodiment of the present invention incorporated therein.

As is seen from FIG. 1, the drive shaft assembly 10 comprises a drive shaft 12, a front universal joint 11 connected to a front end of the drive shaft 12, and a rear universal joint 17 connected to a rear end of the drive shaft 12. Although not shown in the drawing, the front universal joint 11 is connected to an output shaft of a transmission and the rear universal joint 17 is connected to an input shaft of a differential.

The drive shaft 12 comprises a first cylindrical part (14a+14b) and a second cylindrical part 16 coupled in a spline-connection manner as will become apparent as the description proceeds.

The first cylindrical part (14a+14b) comprises a smaller diameter tubular portion 14a and a larger diameter tubular portion 14b coaxially connected to constitute an elongate stepped tubular structure, as shown. The bore of the smaller diameter tubular portion 14a is formed with a plurality of splines 13.

The second cylindrical part 16 is formed about its outer surface with a plurality of splines 15. The second cylindrical part 16 is received in the bore of the smaller diameter tubular portion 14a of the first cylindrical part (14a+14b) while effecting a spline-connection therebetween. Thus, the two parts 16 and (14a+14b) can rotate together like a unit about their common axis while permitting a relative displacement therebetween in the direction of the common axis.

For ease of understanding, the internally splined smaller diameter tubular portion 14a of the first cylindrical part (14a+14b) will be named as "female shaft", and the externally splined second cylindrical part 16 will be named as "male shaft" in the following.

Figure 2:
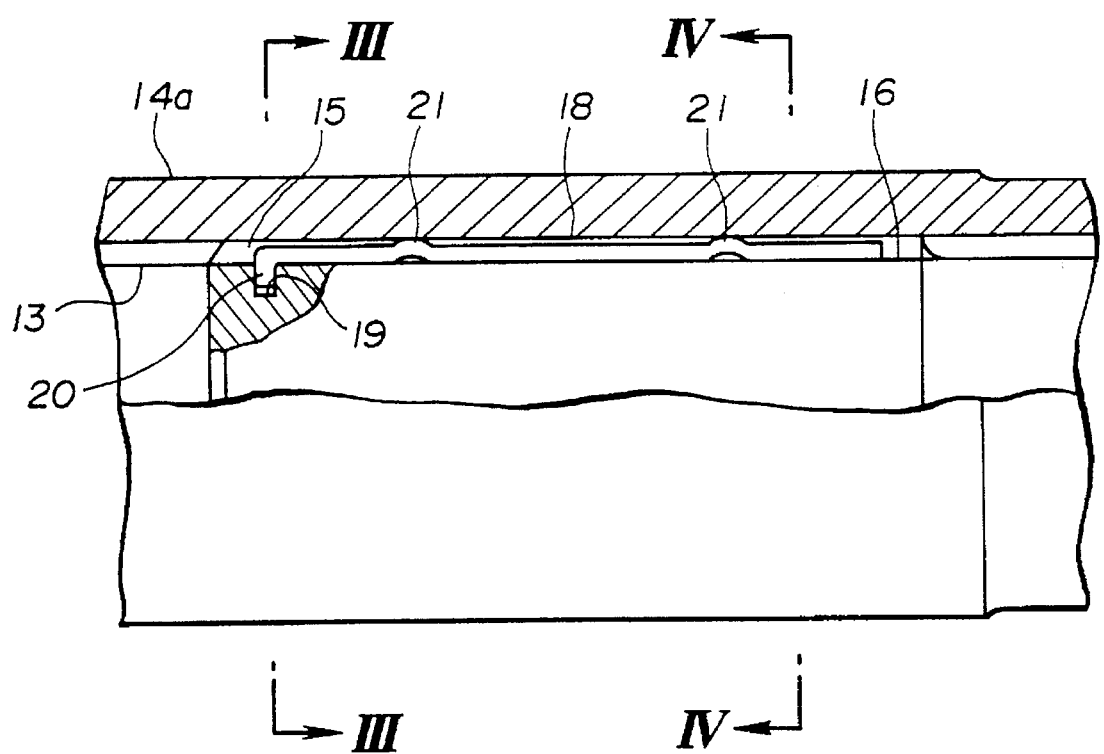
FIG. 2 is an enlarged view of a portion of the drive shaft assembly, which is indicated by the arrow "II" in FIG. 1.
Figure 3:
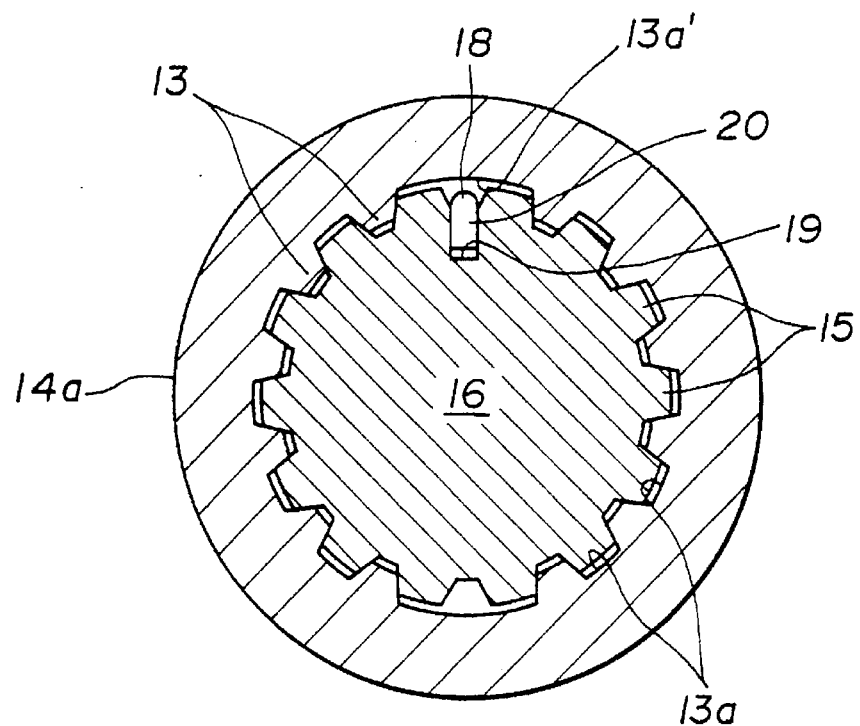
FIG. 3 is a sectional view taken along the line III—III of FIG. 2.
Figure 4:
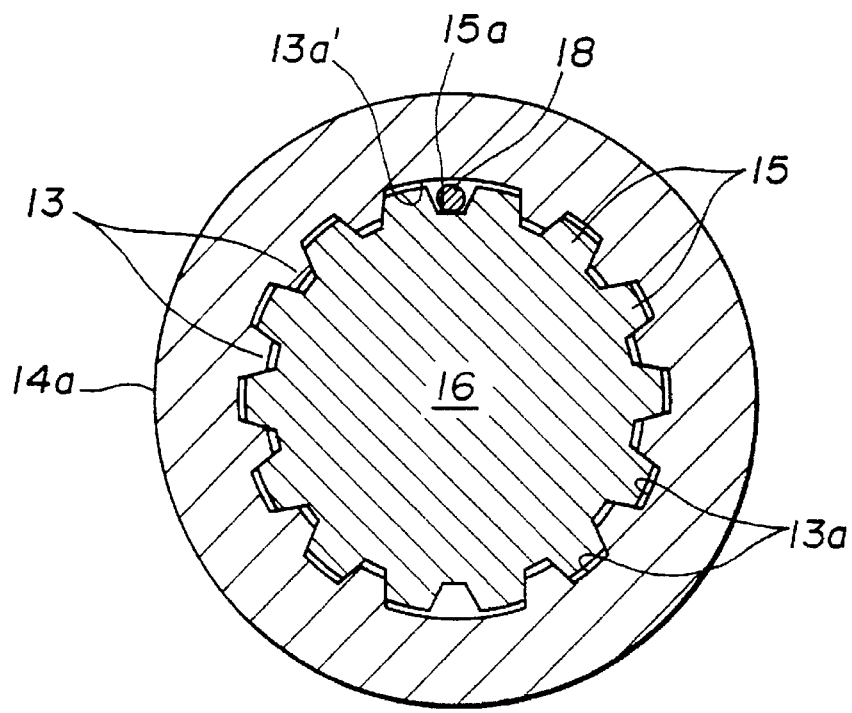
FIG. 4 is a sectional view taken along the line IV—IV of FIG. 2.

As is seen from FIGS. 2, 3 and 4, a so-called "play suppression bar" 18 is put in a thin annular space defined between the male shaft 16 and the female shaft 14a of the first cylindrical part (14a and 14b). The space is filled with grease. In this first embodiment, a resilient steel wire is used as the play suppression bar 18.

As is seen from FIGS. 2 and 4, the elongate play suppression bar 18 extends in and along one of longitudinally extending grooves 15a of the male shaft 16, each groove 15a being defined between adjacent two splines 15. Preferably, the play suppression bar 18 extends throughout the entire length of the groove 15a.

For accommodation of the play suppression bar 18, one of the splines 13 of the female shaft 14a, which would be engaged with the selected extending groove 15a, has been removed. Thus, the two adjacent grooves 13a with the removed spline merged to constitute a wider groove 13a', as shown in FIGS. 3 and 4.

In the illustrated first embodiment, the female shaft 14a has at a diametrically opposed position another wider groove 13a" for the reason which will become apparent hereinafter.

As is seen from FIGS. 2 and 3, the front end of the play suppression bar 18 is bent radially inward at right angles to form a hook portion 20 thrust into an engaging hole 19 formed in the bottom land of the male shaft 16. Thus, the bar 18 is kept held the male shaft 16 even when the relative displacement takes place between the male shaft 16 and the female shaft 14a.

As is seen from FIG. 2, the play suppression bar 18 is formed with two outwardly raised portions 21 each being resiliently pressed against the bottom land of the wider groove 13a' of the female shaft 14a.

Figure 5:
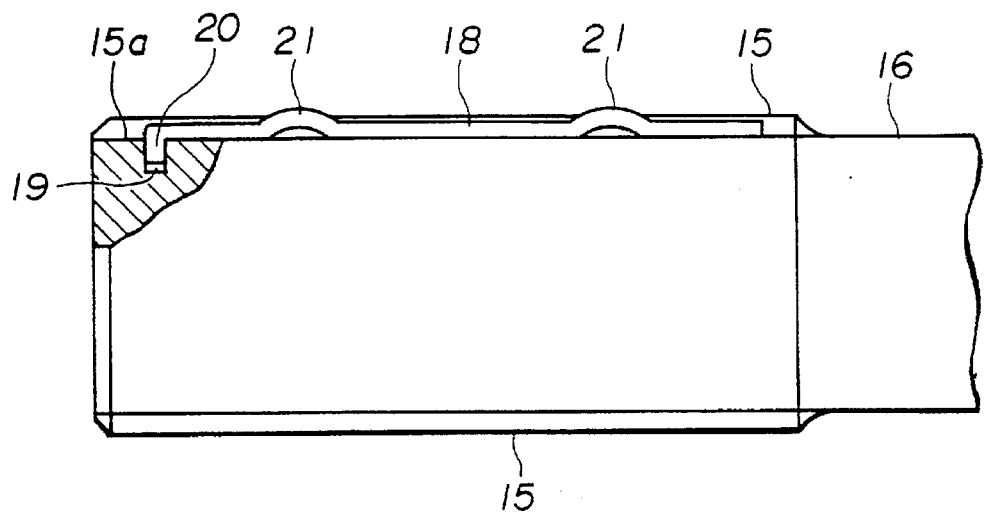
FIG. 5 is a partially cut side view of a front end portion of a spline shaft (or splined male shaft) constituting a part of the shaft coupling structure of the first embodiment.

As is seen from FIG. 5, when receiving no stress, each raised portion 21 of the play suppression bar 18 extends beyond the top of the adjacent spline 15 of the male shaft 16.

Figure 6:
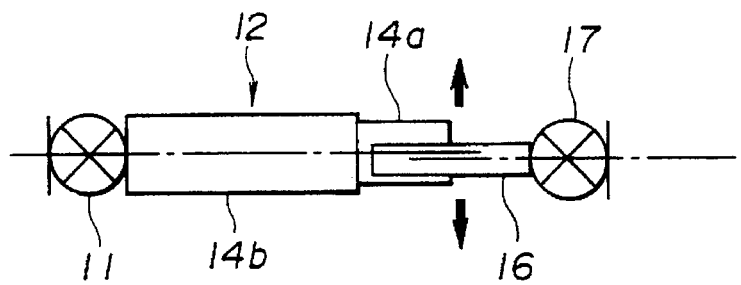
FIG. 6 is a schematic view of the shaft coupling structure of the first embodiment, showing its feature exaggeratedly.

Thus, when the play suppression bar 18 is set in the right position in the above-mentioned manner, raised portions 21 thereof are compressed and thus produce a biasing force by which the male shaft 16 and the female shaft 14a are biased in opposite directions, as will be understood from FIG. 6. That is, in FIG. 4, due to the biasing force, the male shaft 16 is biased downward while the female shaft 14a is biased upward, which biasing functions to bias these two members pressed against each other and thus suppresses or at least minimizes the play of the male shaft 16 relative to the female shaft 14a and vice versa.

Since the thickness of the play suppression bar 18 can be increased to a degree corresponding to the height of the removed spline of the female shaft 14a, durability of the play suppression bar 18 is assured.

As a material of the play suppression bar 18, plastics and compound plastics are usable so long as they have sufficient resiliency and wear resistance. Although, in the above-mentioned embodiment, the play suppression bar 18 has two raised positions 21, the number of the raised portions 21 is not limited to two. That is, the bar 18 may have only one raised portion or more than two raised portions so long as they can produce a biasing force suitable for suppressing the play.

Figure 7:
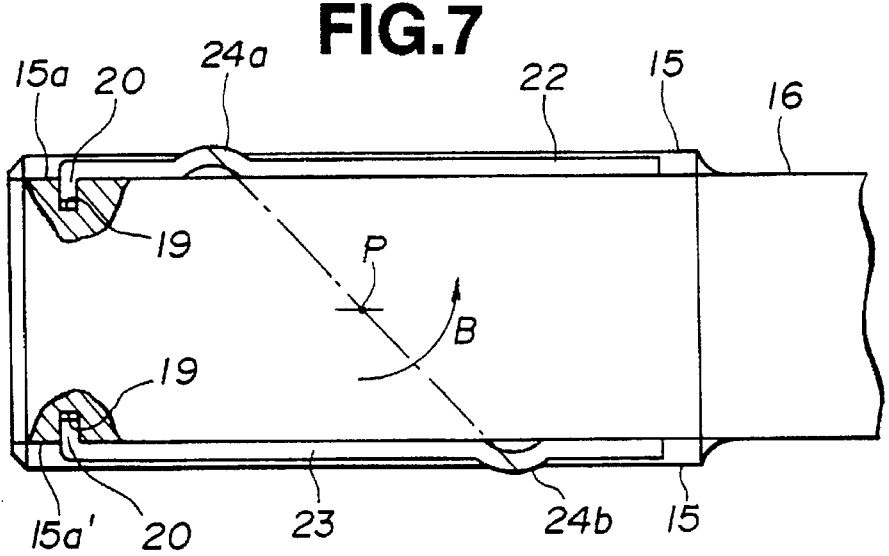
FIG. 7 is a view similar to FIG. 5, but showing another spline shaft (or splined male shaft) which constitutes a part of a shaft coupling structure of a second embodiment of the present invention.
Figure 8:
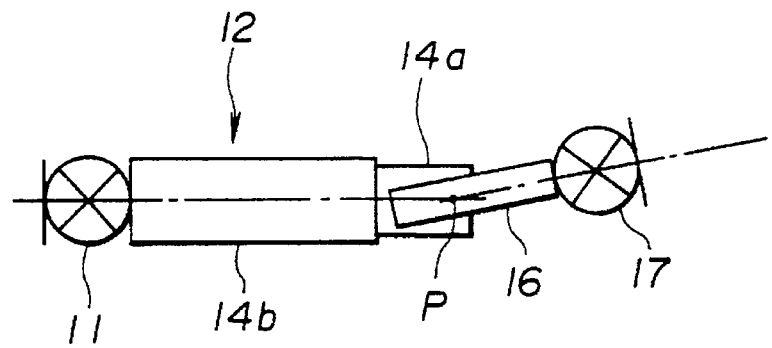
FIG. 8 is a view similar to FIG. 6, but showing the shaft coupling structure of the second embodiment exaggeratedly.

Referring to FIGS. 7 and 8, particularly FIG. 7, there is shown a male shaft 16 constituting a part of a shaft coupling structure of a second embodiment of the present invention.

In this second embodiment, two play suppression bars 22 and 23 are employed, which are respectively accommodated in diametrically opposed grooves 15a and 15a' of the male shaft 16, each groove 15a or 15a' being defined between adjacent two splines 15. For accommodation of these two play suppression bars 22 and 23, diametrically opposed two of the splines 13 of the female shaft 14a of the first cylindrical part (14a+14b), which would be engaged with the selected grooves 15a and 15a', have been removed, as will be understood from FIG. 4. Thus, in this second embodiment, the female shaft 14a has two wider grooves 13a' and 13a", as shown.

The front end 20 of each bar 22 or 23 is bent radially inward at right angles and thrust into an engaging hole 19 formed in the male shaft 16.

As is seen from FIG. 7, the play suppression bar 22 is formed at its front part with a raised portion 24a and the other play suppression bar 23 is formed at its rear part with a raised portion 24b.

When the play suppression bars 22 and 23 are set in the right positions in the above-mentioned manner, raised portions 24a and 24b of the bars 22 and 23 are resiliently pressed against the bottom lands of the diametrically opposed wider grooves 13a' and 13a" of the female shaft 14a and thus the male shaft 16 is biased relative to the female shaft 14a and vice versa. Because the raised portions 24a and 24b are arranged in different positions in the axial direction, the compression of the raised portions 24a and 24b biases the male shaft 16 to pivot in the direction of the arrow "B" about the point "P", as is seen from FIG. 7. That is, in FIG. 8, due to the biasing force, the male shaft 16 is biased in a counterclockwise direction about the point "P" while the female shaft 14a is biased in a clockwise direction about the point "P", which biasing functions to bias these two shafts 16 and 14a to constitute a fixed bent structure and thus suppresses or at least minimizes the play of the male shaft 16 relative to the female shaft 14a and vice versa.

Usage of the two play suppression bars 22 and 23 in this second embodiment induces a balanced arrangement between the male and female shafts 16 and 14a.

Figure 9:
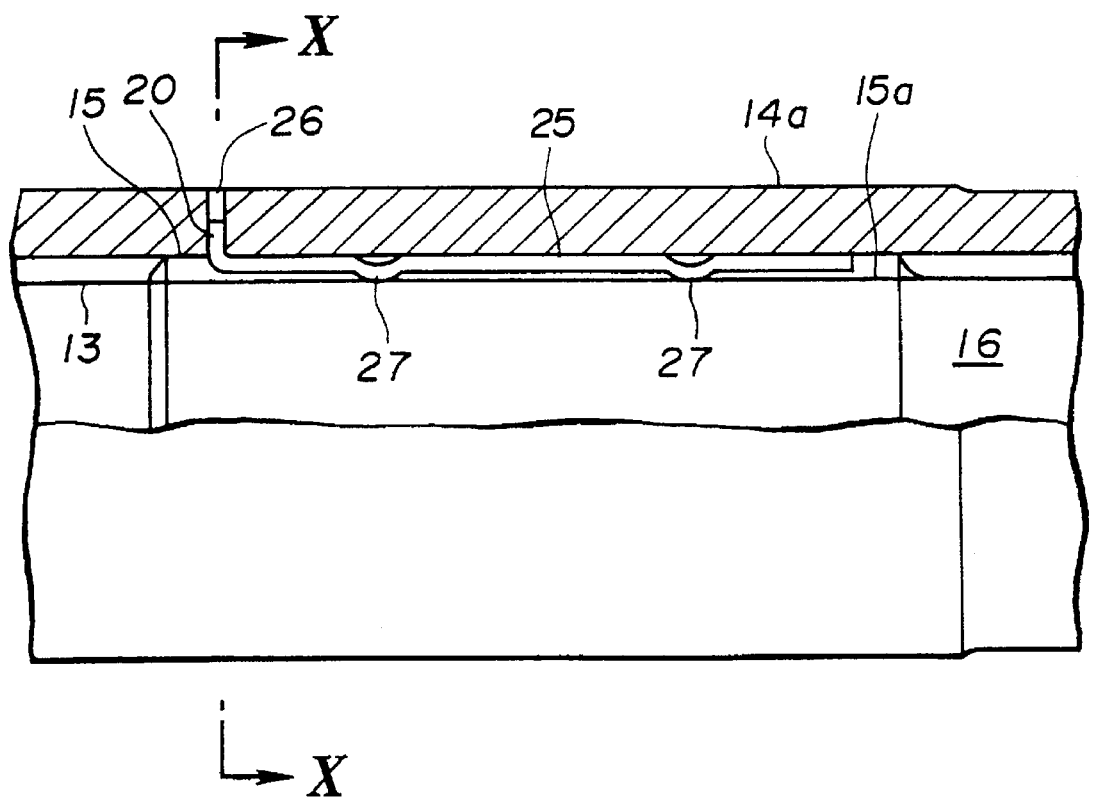
FIG. 9 is view similar to FIG. 2, but showing a shaft coupling structure of a third embodiment of the present invention.
Figure 10:
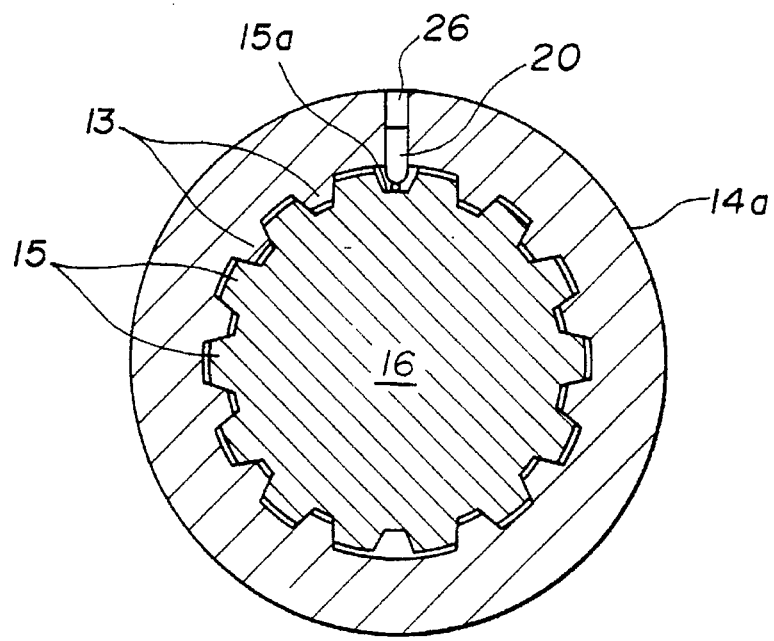
FIG. 10 a sectional view taken along the line X—X of FIG. 9.

Referring to FIGS. 9 and 10, particularly FIG. 9, there is shown, but partially, a shaft coupling structure of a third embodiment of the present invention.

The shaft coupling structure of this third embodiment is substantially the same as that of the above-mentioned first embodiment except the following.

That is, in the third embodiment, the play suppression bar 25 is held by or hooked to the female shaft 14a of the first cylindrical part (14a+14b).

As is seen from the drawings, for the holding of the play suppression bar 25, the front end of the bar 25 is bent radially outward at right angles to form a hook portion 20 thrust into an engaging hole 26 formed in the female shaft 14a.

The play suppression bar 25 is formed with two inwardly raised portions 27 each being resiliently pressed against the bottom land of the groove 15a of the male shaft 16. That is, when the play suppression bar 25 is set in the right position, the two raised portions 27 of the bar 25 are compressed to produce a biasing force by which the two shafts 14a and 16 are biased in the opposite directions. Thus, undesired play of them is suppressed or at least minimized.

If the splined portion of the male shaft 16 has been subjected to induction hardening for hardening the splines 15, abrasion of the bottom land of the groove 15a of the male shaft 16 by the two raised portions 27 can be reduced.

Figure 11:
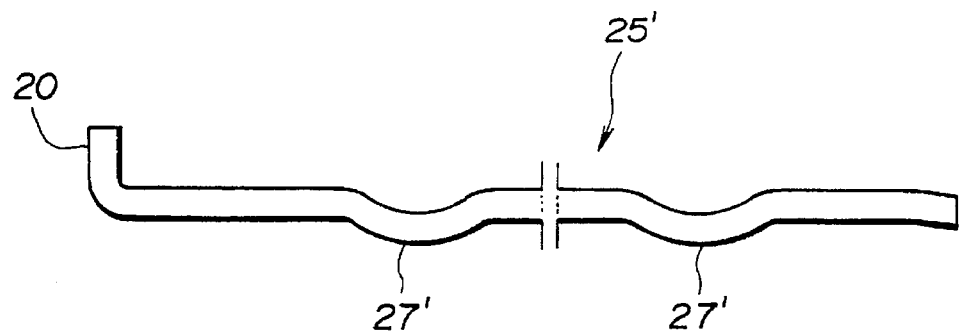
FIGS. 11, 12 and 13 are side, front and plan views of a play suppression bar employable in the third embodiment.
Figure 12:
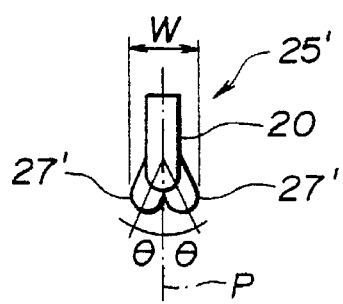
Figure 13:
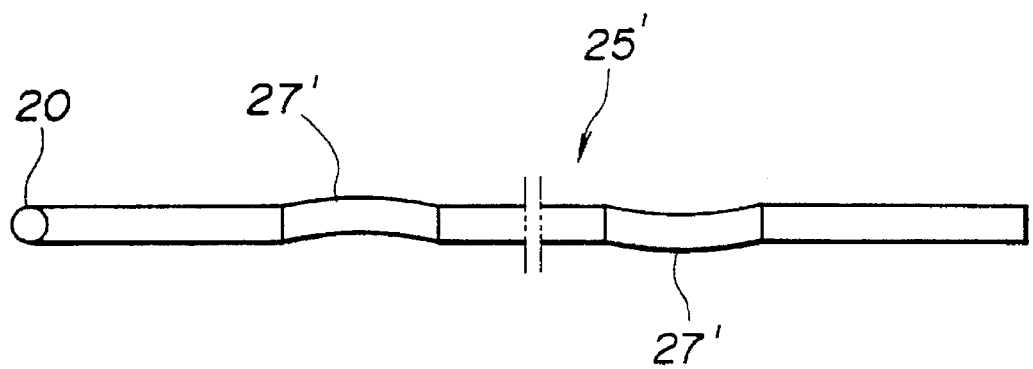

Referring to FIGS. 11, 12 and 13, there is shown a play suppression bar 25' that can be used as a substitute for the bar 25 of the third embodiment. That is, as is seen from FIG. 12, the two inwardly raised portions 27' of the play suppression bar 25' are inclined in a lateral direction to define therebetween a certain angle "2θ". That is, in FIG. 12, one raised portion 27' is inclined leftward by "θ" from a vertical plane "P" and the other raised portion 27' is inclined rightward by "θ" from the vertical plane "P".

In this modification, the two raised portions 27' can have an apparent width "W" sufficient to make a pressed contact of the portions 27' with opposed side walls of the groove 15a of the male shaft 16. Thus, in addition to suppression to the play in the radial direction, play of the male shaft 16 in a direction about the axis thereof can be also suppressed.

If the two raised portions 27' are inclined in the same direction to bias the male shaft 16 in one direction about the axis of the male shaft 16 relative to the female shaft 14a, the pulsating torque from the engine can be effectively absorbed by the shaft coupling structure.

Figure 14:
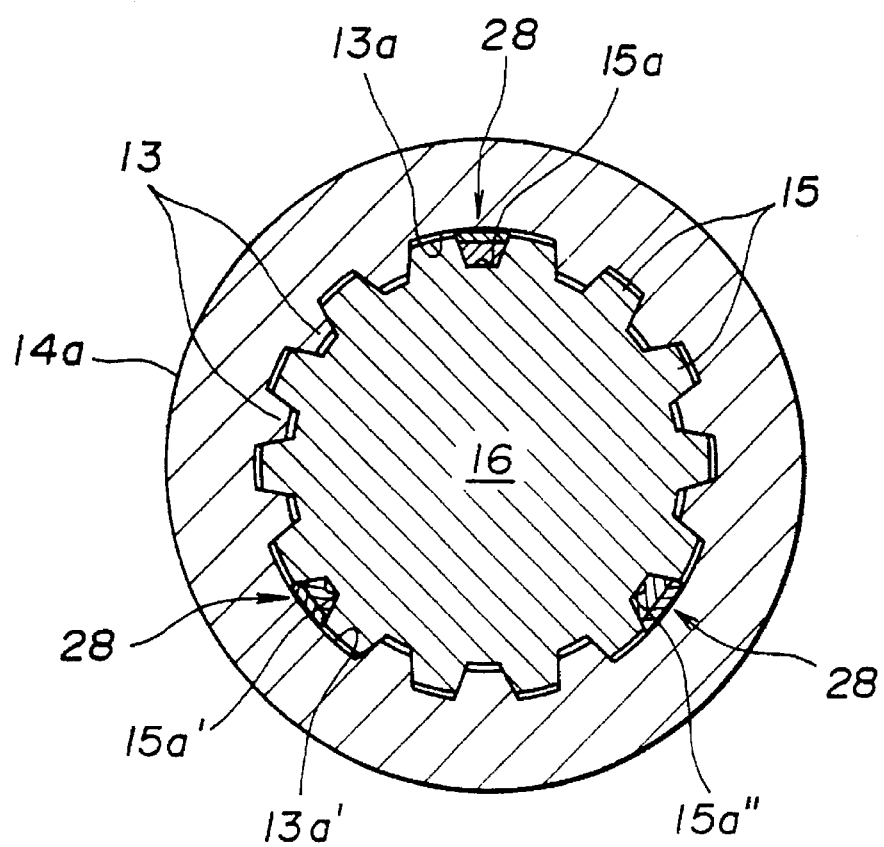
FIG. 14 is a view similar to FIG. 4, but showing a shaft coupling structure of a fourth embodiment of the present invention.
Figure 15:
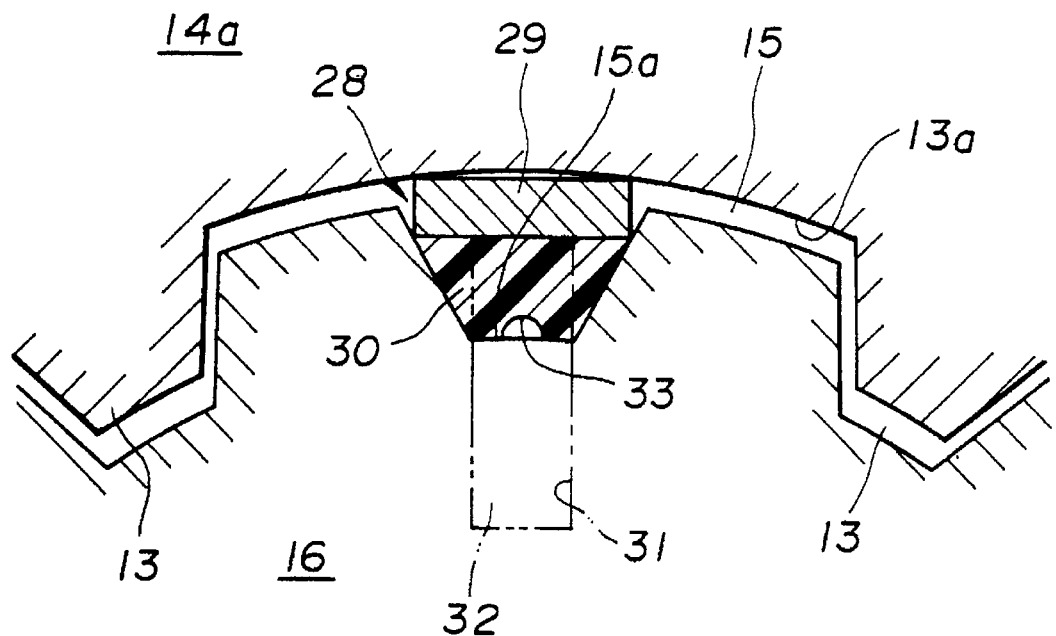
FIG. 15 is an enlarged view of a part of the shaft coupling structure of FIG. 14.
Figure 16:
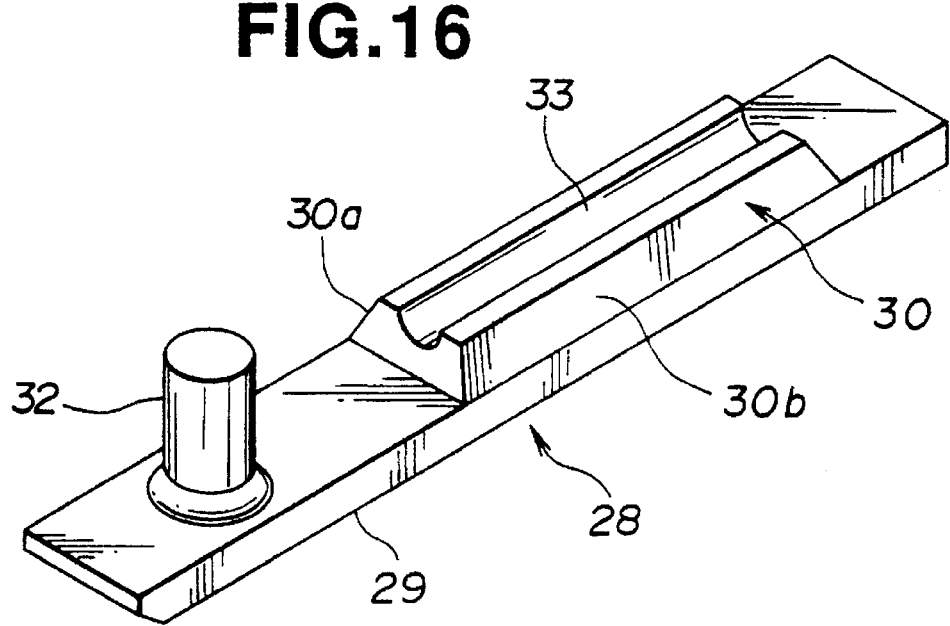
FIG. 16 is a perspective view of a play suppression bar employed in the fourth embodiment.

Referring to FIGS. 14, 15 and 16, particularly FIG. 14, there is shown a shaft coupling structure of a fourth embodiment of the present invention.

As is seen from FIG. 14, in the fourth embodiment, three play suppression bars 28 are employed, which are accommodated in three equally spaced grooves 15a, 15a' and 15a" of the male shaft 16. That is, the three grooves 15a, 15a' and 15a" are spaced from one another by 120 degrees. For accommodation of the three play suppression bars 28, three equally spaced splines of the female shaft 14a of the first cylindrical part (14a+14b), which would be engaged with the three grooves 15a, 15a' and 15a", have been removed. Thus, in this fourth embodiment, the female shaft 14a has three wider grooves 13a, 13a' and 13a", as shown.

The three play suppression bars 28 are identical in shape, one of which is shown in FIG. 16.

The bar 28 comprises generally an elongate base plate member 29, an elastic block 30 fixed to the base plate member 29 and a pin 32 fixed to one end of the base plate member 29. The base plate member 29 is constructed of a plastic or the like having a lower friction coefficient, and the elastic block 30 is constructed of flexible rubber, flexible foamed plastic or the like. The elastic block 30 has side walls 30a and 30b inclined toward each other. The elastic block 30 is formed with a longitudinally extending groove 33 to adjust the flexibility of the elastic block 30.

When receiving no stress, the play suppression bar 28 has a thickness somewhat greater than the height of the splines 15 of the male shaft 16.

As is seen from FIG. 15, in assembly, the play suppression bar 28 is snugly put in the groove 15a of the male shaft 16 pressing the base plate member 29 against the bottom land of the wider groove 13a of the female shaft 14a. That is, in assembly, the pin 32 is thrust in an engaging hole 31 formed in the male shaft 16 and the elastic block 30 is resiliently compressed in the groove 15a pressing the inclined side walls 30a and 30b against the inclined opposed side walls of the groove 15a.

Thus, when the three play suppression bars 28 are set in the right positions in the above-mentioned manner, the elastic blocks 30 of these bars 28 are compressed and thus produce a biasing force by which the male shaft 16 is biased to take a center position with respect to the female shaft 14a. That is, the male shaft 16 is tightly but resiliently held by the female shaft 14a with the three bars 28 resiliently compressed therebetween. Thus, undesired play between the two shafts 16 and 14a is suppressed or at least minimized.

Because the three play suppression bars 28 are arranged at equally spaced intervals, balanced arrangement between the two shafts 16 and 14a is much assuredly obtained.

If desired, more than three play suppression bars 28 may be arranged at equally spaced intervals.

It is to be noted that in this fourth embodiment, each play suppression bar 28 is permitted to contact both the male and female shafts 16 and 14a in a so-called "surface to surface" contacting manner. Thus, even if the engaging hole 31 is not properly oriented, the size and the flexibility of the elastic block 30 can compensate for the poor orientation of the engaging hole 31, and thus, sufficient biasing force can be produced by each of the play suppression bars 28.

If desired, the outer surface of the base plate member 29 and the inner surface of the elastic block 30 may be curved in compliance with the curved shape of the bottom land of the wider groove 13a of the female shaft 14a and the bottom land of the groove 15a of the male shaft 16.

Figure 17:
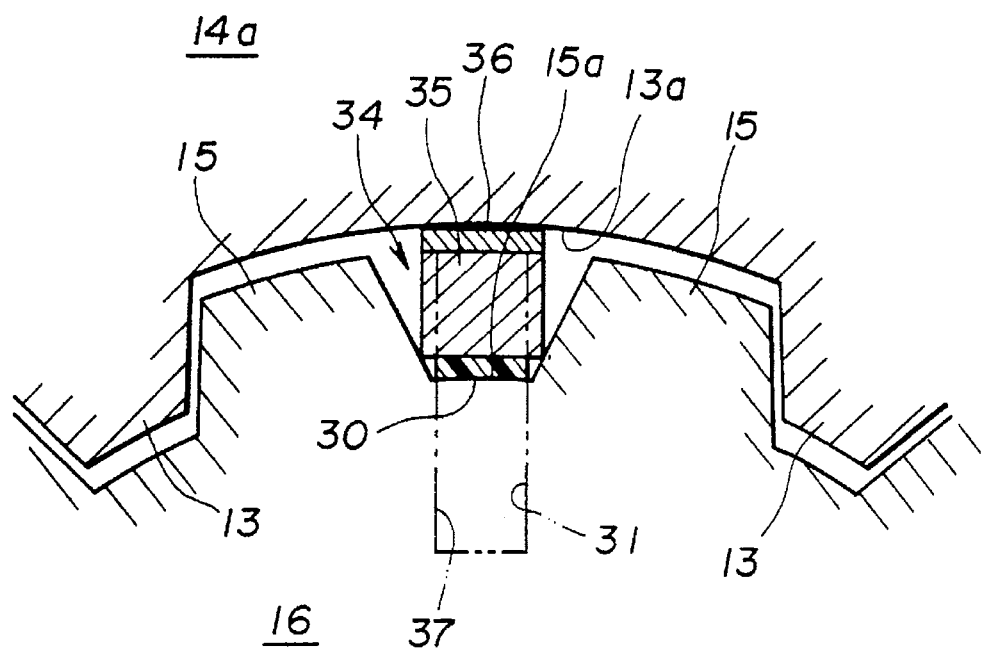
FIG. 17 is a view similar to FIG. 15, but showing a shaft coupling structure of a fifth embodiment of the present invention.
Figure 18:
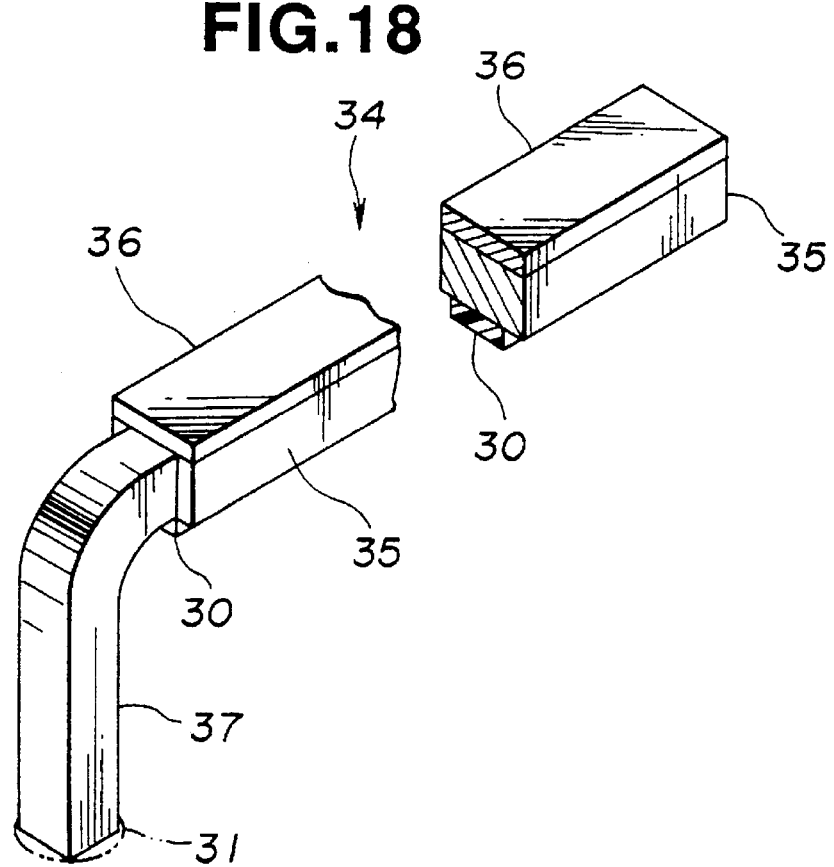
FIG. 18 is a perspective view of a play suppression bar employed in the fifth embodiment.

Referring to FIGS. 17 and 18, particularly FIG. 17, there is shown a shaft coupling structure of a fifth embodiment of the present invention.

Since the shaft coupling structure of this embodiment is substantially the same as that of the above-mentioned fourth embodiment except the play suppression bars 34, only the bars 34 will be described in detail in the following.

The play suppression bars 34 are identical in shape, one of which is shown in FIG. 18. The bar 34 comprises an elongate base member 35 of rectangular cross section, a low frictional outer plate member 36 fixed to an outer surface of the base member 35, and an elastic inner plate member 30 fixed to an inner surface of the base member 35. The elongate base member 35 is constructed of a metal and has a slender end portion bent at right angles to form a pin portion 37. The outer plate member 36 is constructed of TEFLON (trade mark) or the like which has a low friction coefficient. The inner plate member 30 is constructed of flexible rubber, flexible foamed plastic or the like.

As is seen from FIG. 17, in assembly, the play suppression bar 34 is snugly put in the groove 15a of the male shaft 16 pressing the outer plate member 36 against the bottom land of the wider groove 13a of the female shaft 14a. That is, in assembly, the pin portion 37 is thrust in an engaging hole 31 formed in the male shaft 16 and the elastic inner plate member 30 is pressed against the bottom land of the groove 15a.

Thus, when the three play suppression bars 34 are set in the right position in the above-mentioned manner, the elastic inner plate members 30 are compressed and thus produce a biasing force by which the male shaft 16 is biased to take a center position with respect to the female shaft 14a.

Because of the nature of the construction, the shaft coupling structure of this fifth embodiment has substantially the same advantages as that of the fourth embodiment of FIGS. 14 to 16.

Figure 19:
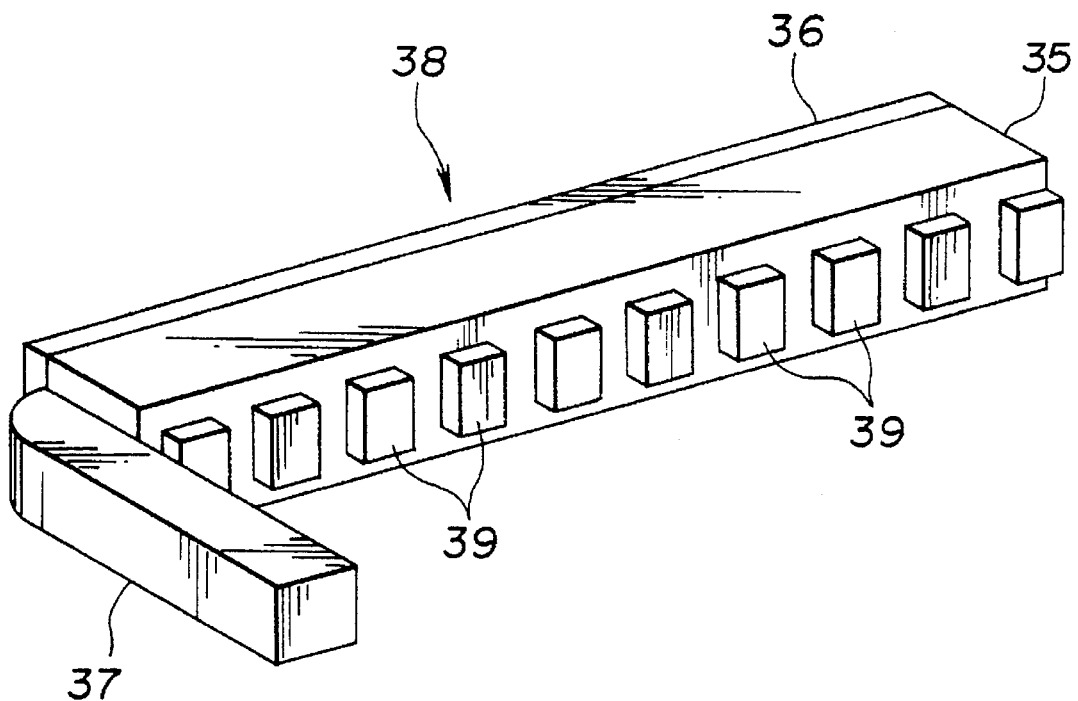
FIGS. 19 and 20 are perspective views of other play suppression bars that can be used in the present invention.

Referring to FIG. 19, there is shown a play suppression bar 38 which can be used in the fifth embodiment of FIG. 17.

The play suppression bar 38 comprises an elongate base member 35 of rectangular cross section, a low friction outer plate member 36 fixed to an outer surface of the base member 35, and a plurality of elastic inner pieces 39 secured to an inner surface of the base member 35. As shown, the elastic inner pieces 39 are aligned and spaced from one another. The elongate base member 35 has a slender end portion bent at right angles to form a pin portion 37.

In assembly, the pin portion 37 is thrust in the engaging hole 31 (see FIG. 17) of the male shaft 16, the outer plate member 36 is pressed against the bottom land of the wider groove 13a of the female shaft 14a and the elastic inner pieces 39 are pressed against the bottom land of the groove 15a of the male shaft 16.

Because the elastic inner pieces 39 are spaced from one another, they can be effectively compressed without interference.

Figure 20:
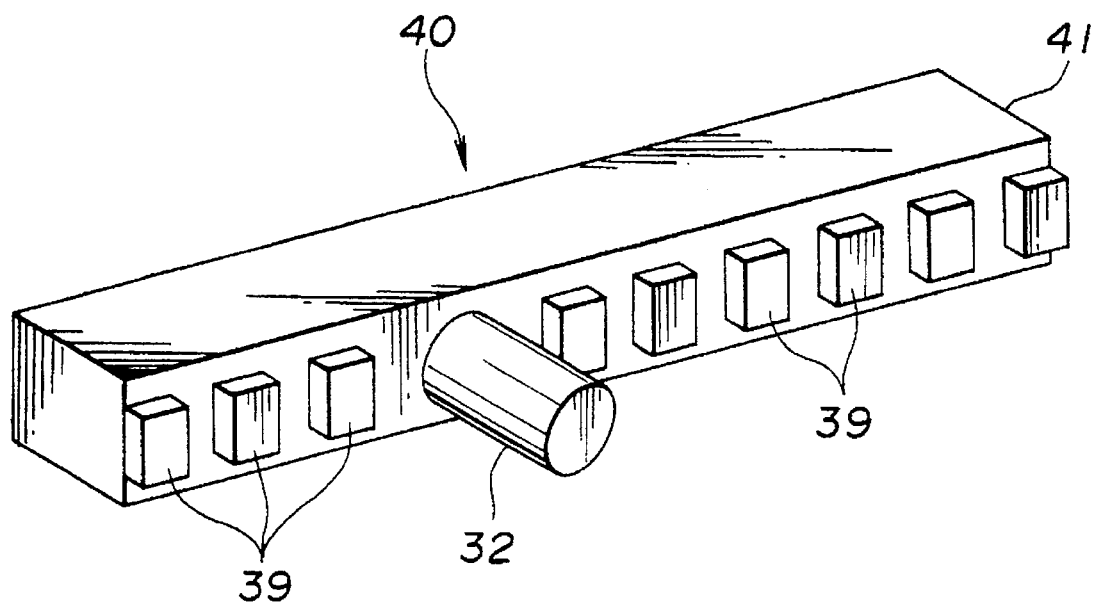

Referring to FIG. 20, there is another play suppression bar 40 which can be also used in the fifth embodiment of FIG. 17.

The play suppression bar 40 comprises an elongate base member 41 of rectangular cross section, a plurality of elastic inner pieces 39 secured to an inner surface of the base member 41 and a pin member 32 secured to an intermediate portion of the base member 41. The base member 41 is constructed of a low friction plastic or the like.

In assembly, the pin member 32 is thrust in the engaging hole 31 (see FIG. 17) of the male shaft 16, the outer surface of the base member 41 is pressed against the bottom land of the wider groove 13a of the female shaft 14a and the elastic inner pieces 39 are pressed against the bottom land of the groove 15a of the male shaft 16.

Because the pin member 32 is connected to the intermediate portion of the base member 41, any stress concentrated at the pin member 32 can be softened, and the connection of the play suppression bar 40 to the male shaft 16 is much assured.

What is claimed is:

1. A shaft coupling structure comprising:
    an internally splined female shaft;
    an externally splined male shaft, the male shaft being coaxially received in the female shaft to establish a spline connection therebetween;
    means defining an axially extending space between mutually overlapped surfaces of the female and male shafts; and
    a first play suppression member interposed between the male and female shafts for suppressing play between the male and female shafts, the play suppression member including:
        an elongate base plate member;
        an elastic block fixed to the elongate base plate member, the elastic block being compressed when the play suppression member is properly set in the axially extending space; and
        a pin fixed to one end of the elongate base plate member, the pin being thrust in an engaging hole formed in the male shaft when the play suppression member is properly set in the axially extending space.

2. A shaft coupling structure according to claim 1, wherein the elastic block is intimately received in a groove defined between adjacent two splines of the male shaft.

3. A shaft coupling structure according to claim 2, wherein the elastic block is formed at a top portion therewith with a groove for adjusting the flexibility thereof.

4. A shaft coupling structure according to claim 3, wherein the elastic block is made of flexible rubber material or flexible foamed material.

5. A shaft coupling structure according to claim 4, wherein the elongate base plate member is a plastic member having a low friction coefficient.

6. A shaft coupling structure according to claim 1, wherein the elastic block comprises a plurality of spaced elastic pieces fixed to one surface of the elongate base plate member.

7. A shaft coupling structure according to claim 6, wherein the elongate base plate member is constructed of a material having a low friction coefficient.

8. A shaft coupling structure according to claim 7, wherein the elastic pieces are pressed against a bottom land of a groove defined between adjacent two splines of the male shaft and the opposite surface of the elongate base plate member is pressed against a bottom land of a groove defined between adjacent two splines of the female shaft.

9. A shaft coupling structure according to claim 6, wherein the elongate base plate member has another surface to which an outer plate member having a low friction coefficient is fixed.

10. A shaft coupling structure according to claim 9, wherein the elastic pieces are pressed against a bottom land of a groove defined between adjacent two splines of the male shaft and the outer plate member is pressed against a bottom land of a groove defined between adjacent two splines of the female shaft.

11. A shaft coupling structure according to claim 1, further comprising second and third play suppression members substantially identical with the first play suppression member, the first, second and third play suppression members being accommodated in respective axially extending spaces defined between the mutually overlapped surfaces of the male and female shafts at evenly spaced intervals with respect to the longitudinal axis of the male shaft.

* * * * *